(12) United States Patent
Ahmavaara

(10) Patent No.: US 8,031,644 B2
(45) Date of Patent: Oct. 4, 2011

(54) NON-NATIVE MEDIA CODEC IN CDMA SYSTEM

(75) Inventor: Kalle Ahmavaara, San Diego, CA (US)

(73) Assignee: Nokia Corporation, Espoo (FI)

( * ) Notice: Subject to any disclaimer, the term of this patent is extended or adjusted under 35 U.S.C. 154(b) by 1933 days.

(21) Appl. No.: 10/874,424

(22) Filed: Jun. 23, 2004

(65) Prior Publication Data

US 2005/0286475 A1    Dec. 29, 2005

(51) Int. Cl.
    *H04B 7/00*    (2006.01)
(52) U.S. Cl. ........ 370/310; 370/328; 370/329; 370/401; 370/466
(58) Field of Classification Search .................. 370/329, 370/335, 401, 310, 328, 338, 466; 704/215
    See application file for complete search history.

(56) References Cited

U.S. PATENT DOCUMENTS

| | | | |
|---|---|---|---|
| 6,111,866 A * | 8/2000 | Kweon et al. ................. | 370/335 |
| 2002/0064164 A1 * | 5/2002 | Barany et al. ................. | 370/401 |
| 2002/0191556 A1 * | 12/2002 | Krishnarajah et al. ........ | 370/329 |
| 2003/0002467 A1 | 1/2003 | Leung | |
| 2003/0065508 A1 * | 4/2003 | Tsuchinaga et al. .......... | 704/215 |
| 2003/0081582 A1 | 5/2003 | Jain et al. | |
| 2003/0174670 A1 | 9/2003 | Mar et al. | |
| 2003/0189900 A1 | 10/2003 | Barany et al. | |
| 2004/0081100 A1 | 4/2004 | El-Malch et al. | |
| 2004/0081195 A1 | 4/2004 | El-Malch et al. | |
| 2005/0025188 A1 | 2/2005 | Numakura et al. | |

FOREIGN PATENT DOCUMENTS

| | | |
|---|---|---|
| WO | WO 01/52467 | 7/2001 |
| WO | W0-01/67787 A2 | 9/2001 |
| WO | WO 01/67787 A2 | 9/2001 |
| WO | WO 01/78430 A1 | 10/2001 |
| WO | WO-02/41546 A2 | 5/2002 |
| WO | WO 02/41546 A2 | 5/2002 |
| WO | WO-03/041424 A2 | 5/2003 |
| WO | WO-2004/006475 A2 | 1/2004 |

OTHER PUBLICATIONS

Kalle Ahmavaara, "CDMA PoC: Interoperability & Global PoC Standards," Technology Forum on Push-to Talk, San Diego, Jun. 30, 2004. Retrieved from the Internet, http://www.cedg.org/news/events/DCMASeminar/040630_Tech_Forum/index.asp.

English Language Translation of Office Action in Chinese Application 200580026847.6, dated Jun. 26, 2009.

* cited by examiner

*Primary Examiner* — Wayne Cai
(74) *Attorney, Agent, or Firm* — AlbertDhand LLP

(57) ABSTRACT

A method and device of sending and receiving encoded media over a CDMA channel. A plurality of speech frames are output by a media codec, and the plurality of encoded media frames are encapsulated into a packet of a first type. The packet of the first type is encapsulated into a datagram of a second type. The datagram of the second type is encapsulated into a datagram of a third type. The datagram of the third type is divided into a plurality of equal-sized pieces, such that each of the equal-sized pieces fits to a specific CDMA channel frame. Each of the CDMA channel frames is sent over a CDMA air interface, and received at a receive end over the CDMA air interface.

24 Claims, 7 Drawing Sheets

NON-NATIVE MEDIA CODEC IN CDMA SYSTEM

FIELD OF THE INVENTION

The present invention relates to sending and receiving coded data output by a non-native CDMA codec in a code division multiple access (CDMA) system. More particularly, the present invention relates to an Adaptive Multi-Rate (AMR) speech codec system and method in a CDMA Push to Talk system.

BACKGROUND OF THE INVENTION

There are different types of CDMA systems, each one in accordance with a particular standard. For example, one standard is entitled "TIA/EIA/IS95-B Mobile Station-Base Station Compatibility Standard for Dual-Mode Wideband Spread Spectrum Cellular System", which is referred to as the IS-95 standard. Another standard offered by the $3^{rd}$ Generation Partnership Project is based on the following standards: 3G TS 25.211, 3G TS 25.212, 3G TS 25.213, and 3G TS 25.214, and is referred to as the W-CDMA standard. Yet another standard offered by the $3^{rd}$ Generation Partnership Project 2 and TR-45.5 is known as the CDMA 2000 standard (formerly known as IS-2000 MC).

Each of the above CDMA standards defines the processing of data for transmission on forward and reverse links. In this regards, media information may be coded at a particular data rate, formatted into a particular frame format, and processed in accordance with a particular processing method. The frame formats and processing utilized by the different standards described above are typically different from each other.

The W-CDMA standard defines an AMR speech coding scheme whereby speech information may be encoded based on one of a number of possible data rates and the coded speech data is provided in a particular format that depends on the selected data rate.

For example, patent Publication WO 01/52467 describes techniques to support AMR coded data in a CDMA 2000 communication system, whereby a number of AMR modes are defined for speech information (of various rates), silence descriptor (of various types), and blank frame.

CDMA systems such as the ones described above use native CDMA speech codecs (coders/decoders) for speech applications. In conventional CDMA systems that support EVRC coded data, the channel structure of the CDMA system does not allow utilization of other types of speech codecs within CDMA. In more detail, AMR is not currently used in CDMA systems for conversational or streaming type of applications.

Also, in conventional CDMA systems using Enhanced Variable Rate Coder (EVRC) speech codecs, speech output from the EVRC speech codecs is sent over a CDMA air interface and received at a receive end, whereby the EVRC speech data is retrieved and played for a user. However, this system is specific to EVRC speech codecs, and is not expandable for other speech data.

Thus, there is a need to be able to utilize AMR speech codecs in CDMA systems, such as for push to talk (PoC) applications.

SUMMARY OF THE INVENTION

One aspect of the present invention is directed to encapsulating AMR speech frames into a CDMA air interface, in order to provide a mechanism for carrying AMR-encoded speech inside a packet data transport channel over the CDMA interface. Such a system may be utilized for services such as CDMA push to talk, for example.

Briefly, one exemplary embodiment relates to a method of sending speech over a CDMA channel, which includes obtaining a plurality of encoded media frames output by a media codec, and encapsulating the plurality of encoded media frames into a packet of a first type. The method also includes encapsulating the packet of the first type into a packet of a second type. The method further includes encapsulating the packet of the second type into a packet of a third type. The method still further includes dividing the packet of the third type into a plurality of substantially equal-sized pieces, such that each of the pieces fits to a specific CDMA channel frame. The method also includes sending each of the CDMA channel frames over a CDMA air interface.

Another exemplary embodiment relates to a device that includes input means for obtaining a plurality of encoded media frames output by a media codec. The device also includes first encapsulating means for encapsulating the plurality of speech frames into a packet of a first type. The device further includes second encapsulating means for encapsulating the packet of the first type into a packet of a second type. The device further includes third encapsulating means for encapsulating the packet of the second type into a packet of a third type. The device still further includes dividing means for dividing the packet of the third type into a plurality of substantially equal-sized pieces, such that each of the equal-sized pieces fits to a specific CDMA channel frame. The device also includes output means for outputting each of the CDMA channel frames over a CDMA air interface.

Another exemplary embodiment relates to a device for receiving encoded media over a CDMA channel. The device includes a receiving unit configured to receive data from a plurality of CDMA channel frames on a CDMA air interface and to combine the data from the plurality of CDMA channel frames into a packet of a first type. The device also includes a first decapsulating unit configured to decapsulate the packet of the first type into a packet of a second type. The device further includes a second decapsulating unit configured to decapsulate the datagram of the second type into a packet of a third type. The device still further includes a third decapsulating unit configured to decapsulate the datagram of the third type into a packet of a fourth type. The device also includes a fourth decapsulating unit configured to decapsulate the datagram of the fourth type into a packet of a fifth type. The device still further includes a data obtaining unit configured to obtain data from a payload portion of the packet of the fifth type, to thereby obtain the encoded media sent over the CDMA air interface.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

The present invention according to the first embodiment provides a system and method for carrying AMR-encoded speech inside a packet data transport channel over a CDMA air interface. The present invention takes advantage of the fact that any type of user data may be sent over a CDMA air interface when using a general IP packet data transport mechanism, whereby the first embodiment sends AMR-encoded speech over a CDMA air interface in such a manner.

Figure 1:
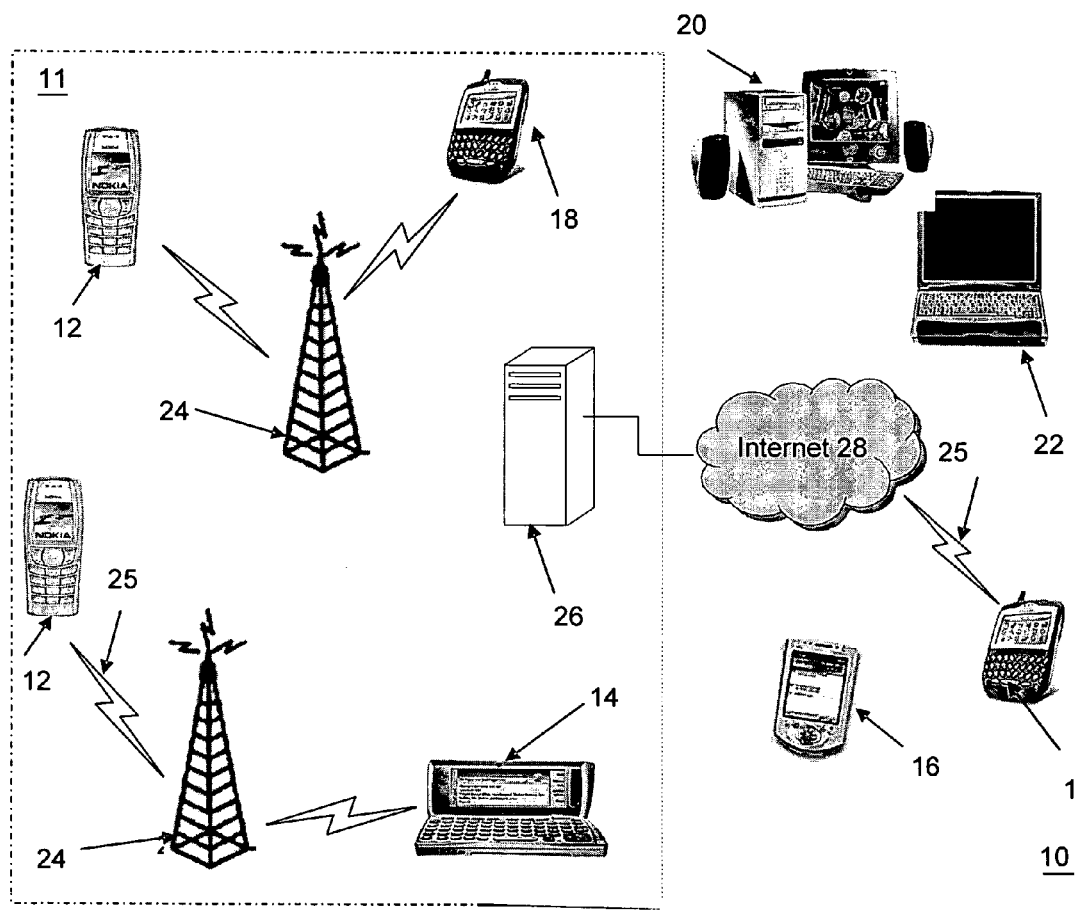
FIG. 1 is an overview diagram of a system according to the present invention.

With reference to FIG. 1, a system 10 in which the present invention can be utilized is comprised of multiple communication devices that can communicate through a network. The system 10 may comprise any combination of wired or wireless networks including, but not limited to, a cellular telephone network, a wireless Local Area Network (LAN), a Bluetooth personal area network, an Ethernet LAN, a token ring LAN, a wide area network, the Internet, etc. The system 10 may include both wired and wireless communication devices. For exemplification, the system 10 shown in FIG. 6 includes a cellular telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of system 10 may include, but are not limited to, a cellular telephone 12, a combination PDA and cellular telephone 14, a PDA 16, an IMD 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the cellular telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
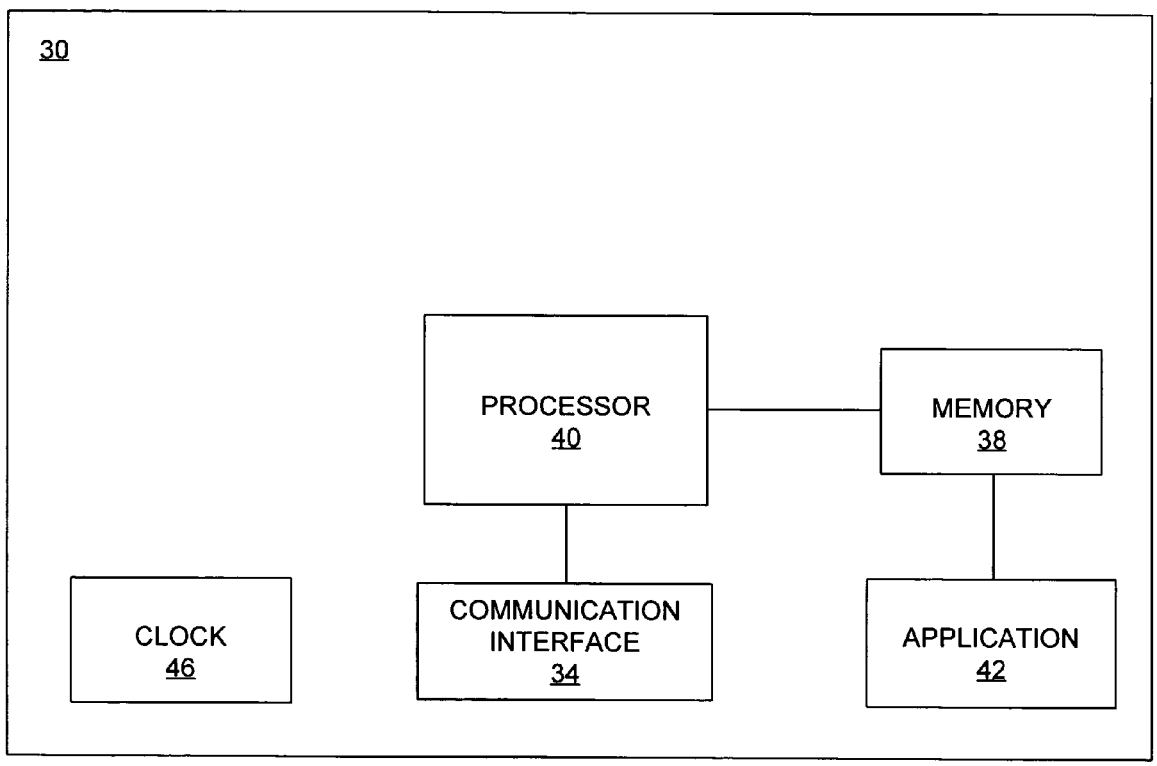
FIG. 2 is a block diagram of a communication device that may correspond to a network device according to an embodiment of the present invention.

One possible implementation of the present invention is as part of a communication device (such as a mobile communication device like a cellular telephone, or a network device like a base station, router, repeater, etc.). A communication device 30, as shown in FIG. 2, comprises a communication interface 34, a memory 38, a processor 40, an application 42, and a clock 46. The exact architecture of communication device 30 is not important. Different and additional components of communication device 30 may be incorporated into the communication device 30 and/or the system 10. For example, if the device 30 is a cellular telephone it may also include a display screen and an input interface such as a keyboard or touch screen. Additionally, the device 30 need not include all of the components depicted in FIG. 7.

The communication interface 34 provides an interface for receiving and transmitting calls, messages, and any other information communicable between devices. The communication interface 34 may use various transmission technologies including, but not limited to, CDMA, GSM, UMTS, TDMA, TCP/IP, SMS, MMS, e-mail, IMS, Bluetooth, IEEE 802.11, and the like to transfer content to and from the device.

The memory 38 is the electronic holding place for the operating system, the application 42, other applications, data, so that the information can be reached quickly by the computer's processor 40. The terminal may have a plurality of memories 38 using different memory technologies including, but not limited to, Random Access Memory (RAM), Read Only Memory (ROM), flash memory, and the like. The data in RAM is volatile meaning that it remains only as long as the device is turned on. When the device is turned off, RAM loses its data. The values stored in ROM are always there, whether the device is on or not. For this reason, it is called non-volatile memory. Flash memory is a type of constantly-powered non-volatile memory that can be erased and reprogrammed in units of memory called blocks. The memory may include a cache. The cache may include, but is not limited to, a dedicated bank of high-speed memory or a reserved section of ROM that is used to improve performance. The cache provides a temporary storage area for instructions and data. The cache may or may not be in non-volatile memory.

The application 42 is an organized set of instructions that, when executed, cause the communication device 30 to behave in a predetermined manner. The application 42 may include, but is not limited to, a word processor application, a spreadsheet application, a presentation tool application, a video player/recorder application, an audio player/recorder application, an image editor/viewer application, an Internet browser application, a directory file system browser application, a messaging application such as an e-mail, an instant messaging application, or a facsimile application, a scheduling application, a contacts application, etc. The instructions may be written using one or more programming languages, assembly languages, scripting languages, etc.

The processor 40 may retrieve a set of instructions such as application from a non-volatile or a permanent memory and copy the instructions in an executable form to a temporary memory. The temporary memory is generally some form of RAM. The term "execution" is the process of running an application or a utility or the carrying out of the operation called for by an instruction. The processor 40 executes an application or a utility, meaning that it performs the operations called for by that instruction set. The processor 40 may be implemented as a special purpose computer, logic circuits, hardware circuits, etc. Thus, the processor 40 may be implemented in hardware, firmware, software, or any combination of these methods.

The application 42, the operating system, and other applications may be executed by the same processor 40. Alternatively, the application 42, the operating system, and other applications may be executed by different processors. The application 42, the operating system, and other applications may be written in the same or different computer languages including, but not limited to high level languages, scripting languages, assembly languages, etc.

The clock 46 provides a current time source for the device 30. The clock 46 may be independent from or integrated with the processor 40.

When using normal speech channels and Voice over Internet Protocol (VoIP) with header stripping, it is not possible to use non-native speech codes in a CDMA air interface. The present invention provides a framing mechanism using an IP datagram packet transfer scheme (e.g., using Service Option 33) to transfer non-native AMR speech codecs over a CDMA air interface.

Figure 3:
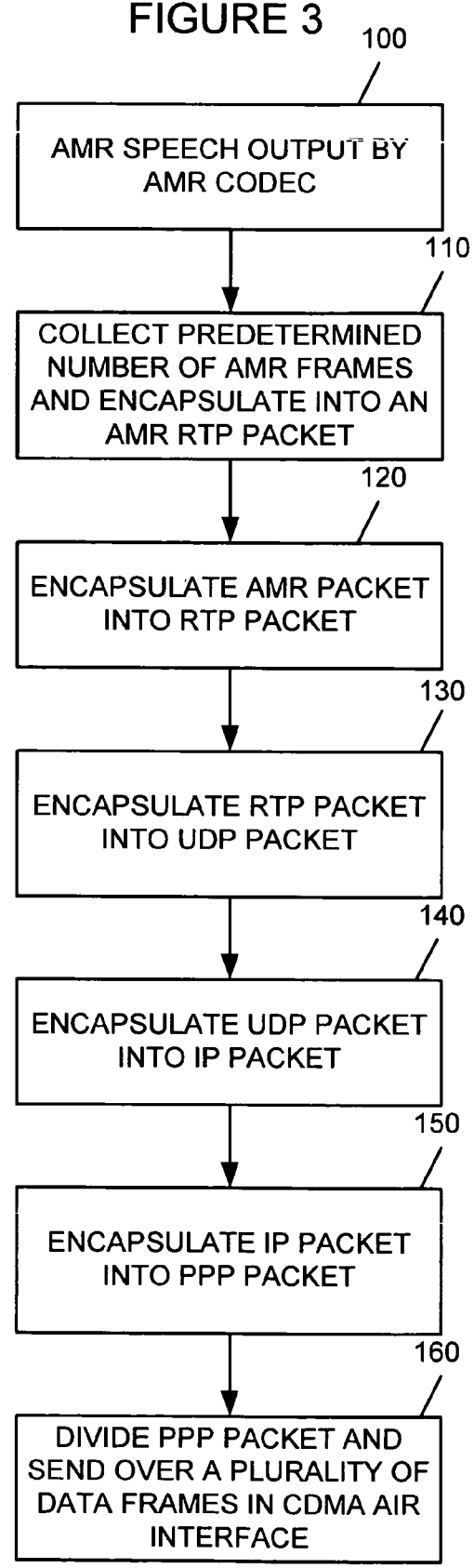
FIG. 3 is a flow chart illustrating steps involved in encapsulating speech data to be sent over a CDMA air interface, according to a first embodiment of the invention.

Referring now to FIG. 3, the first embodiment of the invention will be described in detail. In step 100, an application, such as Push to Talk, operates with a certain mode of AMR speech codec, to thereby produce a certain sized AMR frame every predetermined frame period (e.g., every 20 milliseconds). In step 110, a predetermined number (N, where N is an integer) of AMR frames are collected together (as output by the codec) and then encapsulated into a single AMR RTP payload. By way of example and not by way of limitation, the N AMR frames are encapsulated into one AMR RTP payload according to Standard RFC 3267, as is known to those skilled in the art. N may be an integer between two and 20, for example.

In step 120, the AMR RTP payload is encapsulated into a Real Time Protocol (RTP) packet. In step 130, the RTP packet is encapsulated into a User Datagram Protocol (UDP) packet. In step 140, the UDP packet is encapsulated into an Internet Protocol (IP) packet. In step 150, the IP packet is encapsulated into a Point-to-Point protocol (PPP) packet. In step 160, the PPP packet is divided up into N pieces, each of which fits to a specific CDMA channel frame. By way of example and not by way of limitation, each of the N pieces fits to a CDMA2000 Rateset1 Fundamental Channel frame with Service Option 33. Service Option 33 is a CDMA2000 mechanism to carry IP datagrams over a CDMA air interface, and is a well known standard. In more detail, a link-layer service option provides one-way or two-way voice communications by providing for transport of header-removed (SO60) or header-compressed (SO61) IP/UDP/RTP packets between a source and a destination.

In step 160, each CDMA frame containing the PPP packet is sent over a CDMA2000 air interface. At a receive end, the PPP packet is received over a plurality of CDMA frames, the packet is decapsulated, and the encoded AMR speech is obtained. In more detail, the decapsulation includes obtaining the AMR payload from the PPP packet, whereby the AMR payload corresponds to N AMR frames output from the AMR codec.

As described above, an IP datagram packet transfer scheme is used to transfer non-native speech codecs, such as AMR speech codecs, over a CDMA air interface. This is done by encapsulation of the AMR data into an RTP datagram, and further encapsulating the RTP datagram into an IP datagram, and utilizing the standard transport of IP datagrams over CDMA2000 Service Option 33, and then performing decapsulation at a receive end to obtain the AMR data from the received IP datagrams.

Figure 4:
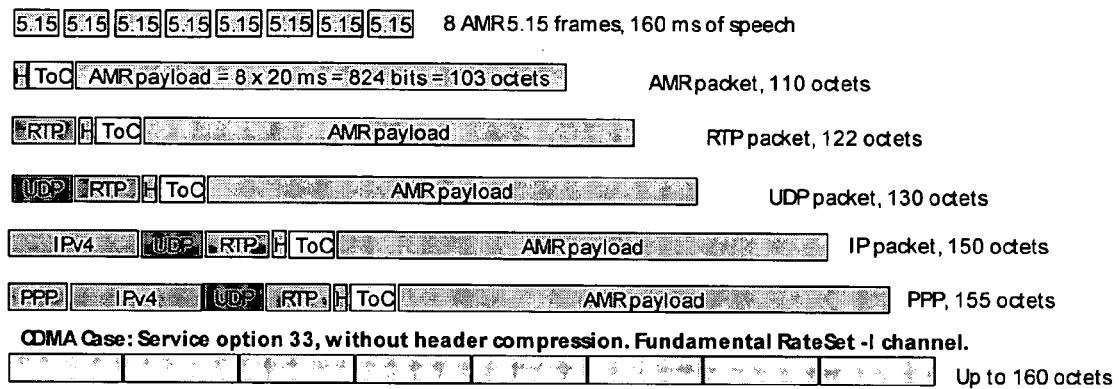
FIG. 4 is a diagram illustrating the multiple encapsulation of speech data so that the speech data can be sent over a CDMA air interface, according to the first embodiment of the invention.

In more detail, referring now to FIG. 4, an encapsulation scheme for encapsulating AMR data will be described in detail. At the top of FIG. 2, eight (8) consecutive AMR 5.15 frames are shown, whereby these AMR frames correspond to a total of 160 milliseconds of speech. Each of the AMR 5.15 frames corresponds to 5.15 kbps of speech (there are 8 current AMR modes of operation, whereby mode 0 provides for 4.75 kbps of speech per frame and mode 7 provides for 12.2 kbps of speech per frame). The 8 AMR 5.15 frames are converted into an AMR packet, having an H field, a Table of Contents (ToC) field, and a payload, whereby the AMR packet payload corresponds to 8×20 milliseconds=824 bits or 103 octets of data. The AMR packet is converted to an AMR RTP packet, whereby an RTP field is appended to the AMR packet in this conversion. The AMR RTP packet corresponds to 122 octets of data. The AMR RTP packet is then converted to a UDP packet, whereby a UDP field is appended to the AMR RTP packet in this conversion. The UDP packet corresponds to 150 octets of data. The UDP packet is then converted to an IP packet, whereby an IP field (shown as IPv4 in FIG. 2) is appended to the UDP packet. The IP packet corresponds to 155 octets of data.

The IP packet is then converted to a PPP packet, whereby a PPP field is appended to the IP packet. The PPP packet corresponds to 155 octets of data. The PPP packet is divided up into N pieces, whereby each of the N pieces of the PPP packet fits to a specific CDMA channel frame, such as a CDMA2000 Rateset1 Fundamental Channel frame with Service Option 33. In FIG. 2, the PPP packet is divided up into eight (8) pieces to fit to a 20 octet-per-frame CDMA channel, and those pieces are sent over a CDMA air interface in such a manner.

Figure 5:
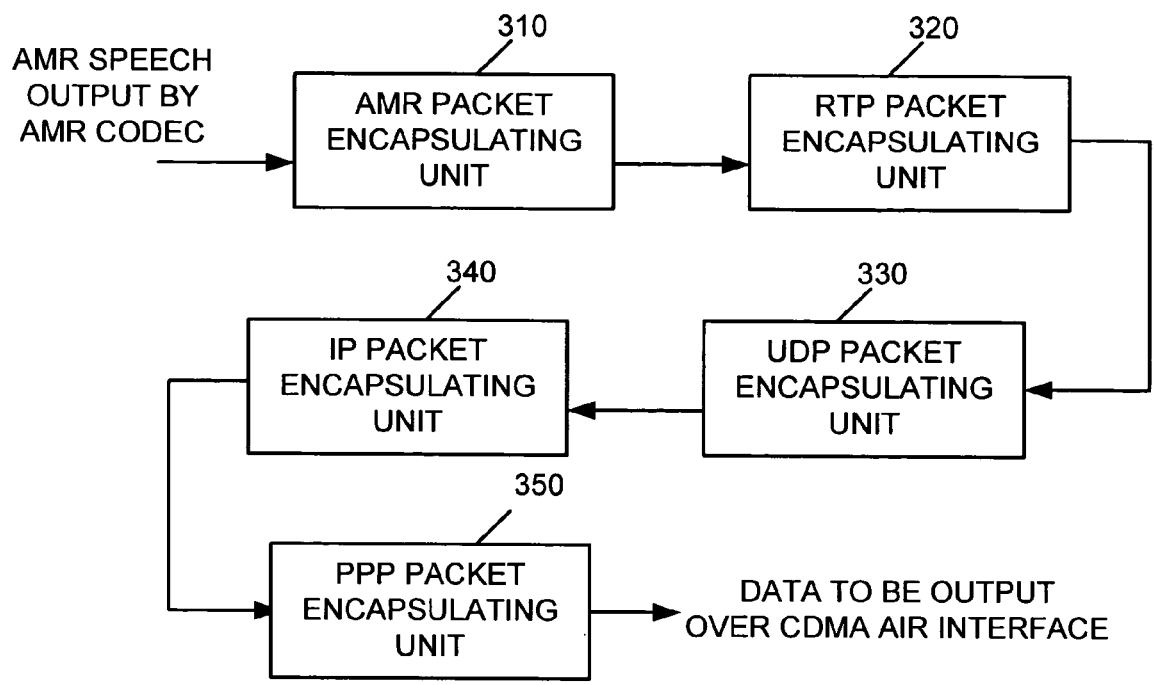
FIG. 5 is a diagram illustrating components making up a speech encapsulation system according to the first embodiment of the invention.

Turning now to FIG. 5, a block diagram of a speech encapsulating system for outputting AMR speech according to the first embodiment is shown. In more detail, an AMR packet encapsulation unit 310 receives AMR frames output by an AMR codec (e.g., via a wired or wireless connection between the AMR codec and the AMR packet encapsulation unit 310), and encapsulates those AMR frames into one AMR packet. An RTP packet encapsulation unit 320 receives the AMR packet output by the AMR packet encapsulation unit 310, and encapsulates the AMR packet into an RTP packet. A UDP packet encapsulation unit 330 receives the RTP packet output by the RTP packet encapsulation unit 320, and encapsulates the RTP packet into a UDP packet. An IP packet encapsulation unit 340 receives the UDP packet output by the UDP packet encapsulation unit 330, and encapsulates the UDP packet into an IP packet. A PPP packet encapsulation unit 350 receives the IP packet output by the UDP packet encapsulation unit 340, and encapsulates the IP packet into a PPP packet. The PPP packet is output over a CDMA air interface, whereby one PPP packet is output over a plurality of consecutive CDMA frames.

At the receive end of the CDMA system, in accordance with a second embodiment of the invention, the PPP packet is received over a plurality of consecutive CDMA frames, and concatenated together to obtain the PPP packet. The PPP field, the IP field, the UDP field, and the RTP field are removed from the received data stream, in order to obtain an AMR packet. From the AMR packet thus obtained, the eight (8) frames of AMR speech are obtained, and played at the receive end of the CDMA system.

Figure 6:
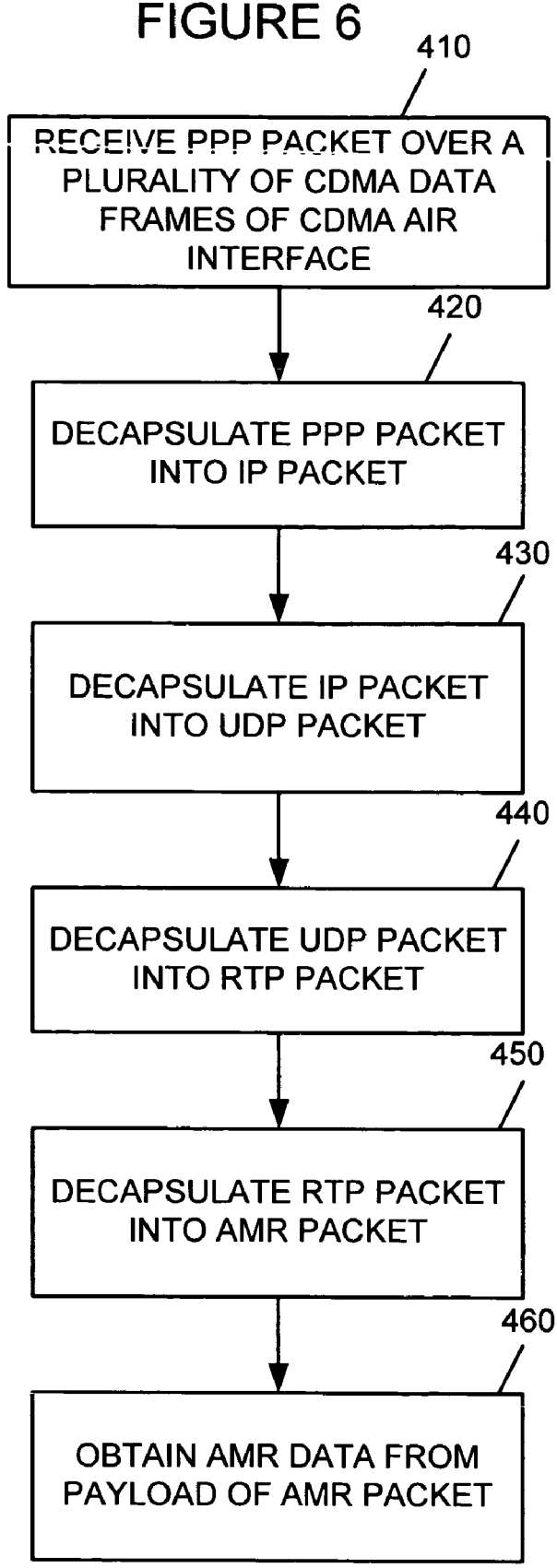
FIG. 6 is a flow chart illustrating steps involved in decapsulating speech data received over a CDMA air interface, according to a second embodiment of the invention.

In more detail, turning now to FIG. 6, the PPP packet is received over a plurality of consecutive CDMA frames in a CDMA air interface, in step 410. In step 420, the PPP packet is descapsulated into an IP packet. In step 430, the IP packet is decapsulated into a UDP packet. In step 440, the UDP packet is decapsulated into an RTP packet. In step 450, the RTP packet is decapsulated into an AMR packet. In step 460, AMR data (output by an AMR codec) is obtained from the AMR payload of the AMR packet, to thereby provide Push to Talk data at a receive end of a CDMA system.

Figure 7:
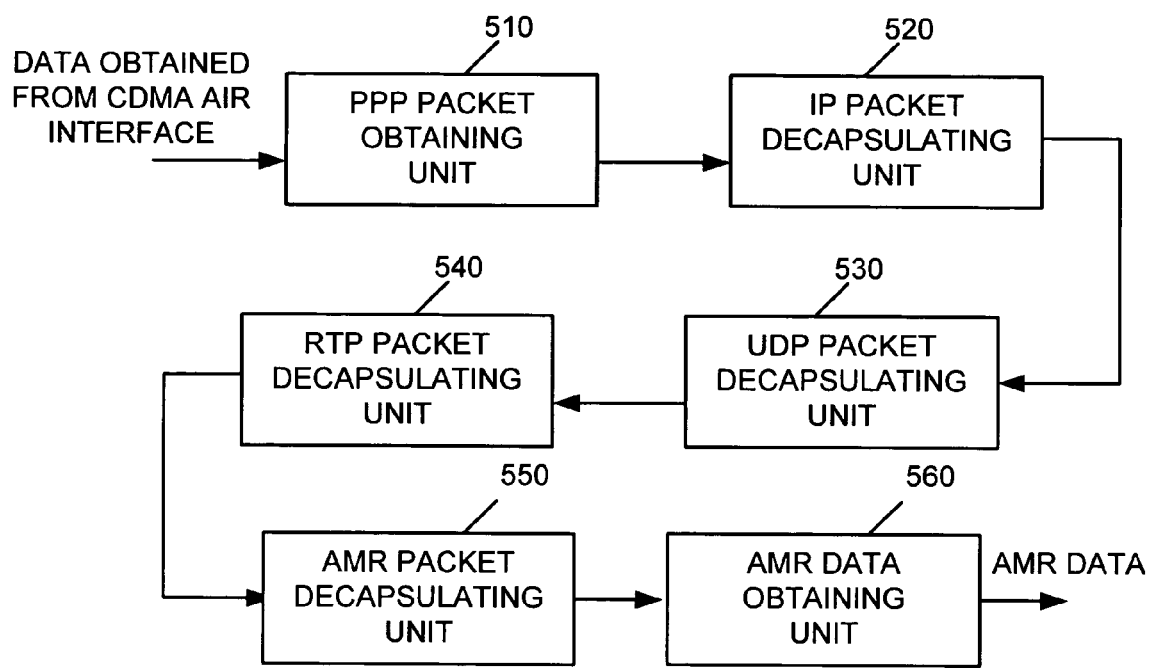
FIG. 7 is a diagram illustrating components making up a speech decapsulation system according to the second embodiment of the invention.

FIG. 7 shows a block diagram of a speech decapsulating system according to the second embodiment of the invention. A PPP packet obtaining unit 510 receives data received over a CDMA air interface, and combines data obtained from a plurality of consecutive CDMA data frames to obtain a PPP packet. An IP packet decapsulating unit 520 receives the PPP packet output from the PPP packet obtaining unit 510, and decapsulates the PPP packet to obtain an IP packet. A UDP packet decapsulating unit 530 receives the IP packet output from the IP packet decapsulating unit 520, and decapsulates the IP packet to obtain a UDP packet. An RTP packet decapsulating unit 540 receives the UDP packet output from the UDP packet decapsulating unit 530, and decapsulates the UDP packet to obtain a RTP packet. An AMR packet decapsulating unit 550 receives the RTP packet output from the RTP packet decapsulating unit 540, and decapsulates the RTP packet to obtain an AMR packet. An AMR data obtaining unit 560 retrieves AMR data from the AMR payload field of the AMR packet output by the AMR packet decapsulating unit 550, to thereby provide AMR data to a receive side of a CDMA system.

The present invention has many applications, including but not limited to the use of non-native speech codecs in 3GPP2 Push to Talk. In more detail, the present invention is applicable from transferring any codec content over CDMA channels, by using encapsulation of codec content to IP packets. One possible example utilizes AMR for Push to Talk (PTT) over Cellular (PoC) for CDMA2000 system using Service Option 33, but one of ordinary skill in the art will recognize that other possible system could be utilized while remaining with the scope of the invention.

Also, as described above, speech data is sent over the CDMA air interface in an encapsulated manner, but one of ordinary skill in the art will recognize that other types of data can be encapsulated and sent in a similar manner, while remaining within the scope of the invention. In a third embodiment of the invention, encoded video is sent over a CDMA air interface by encapsulating video data (e.g., compressed video data) into an IP packet, such as in the manner described above with respect to speech data. In a fourth embodiment of the invention, the encoded video sent via a system according to the third embodiment is received at a receive end of a CDMA air interface, and decapsulated in a plurality of steps to obtain the compressed video data sent via the CDMA data frames.

While the present invention has been described above without the use of header compression and with IP version 4 (IPv4) for converting a UDP packet to an IP packet, other IP version standards may be utilized while remaining within the scope of the invention. Additionally, header compression may be utilized. For example, IPv6 can be utilized as an encapsulation method combined with further header compression applied to the resulting RTP/UDP/IPv6 datagram. Also any other combination of IP versions and header compression schemes may also be utilized.

Also, the four-level encapsulation described above with respect to the first and second embodiments is utilized for sending streaming content (e.g., streaming audio) over CDMA air interface. PPP is a specific packet format used for Service Option 33, whereby if the transfer of AMR data is to be done over CDMA 2000 using a channel other than a basic 1X circuit switched channel, the PPP encapsulation may be omitted.

In the present invention, non-native media codecs (for conversational or nearly conversational services) are used in CDMA2000 systems by utilizing a generic CDMA 2000 IP data transport over-the-air, instead of a media codec tailored to CDMA 2000 channels. In the example described above, AMR for PoC with Service Option 33 is sent over a generic CDMA IP data transport over-the-air.

This detailed description outlines exemplary embodiments of a method, device, and system for a non-native speech codec in a CDMA system. In the foregoing description, for purposes of explanation, specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

The various embodiments described herein are described in the general context of method steps or processes, which may be implemented in one embodiment by a computer program product, embodied in a non-transitory computer-readable medium, including computer-executable instructions, such as program code, executed by computers in networked environments. A non-transitory computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein.

While the exemplary embodiments illustrated in the FIGURES and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims. For example, while the first and second embodiments have been described with respect to AMR codecs for encoding and decoding audio data, the present invention made be utilized for other media (e.g., video) and other types of codecs (media codecs) sent and received over a CDMA system.

What is claimed is:

1. A method of sending encoded media over a CDMA channel, comprising:
   obtaining a plurality of encoded media frames output by a non-native media codec, and
   encapsulating the plurality of encoded media frames into an AMR RTP packet;
   encapsulating the AMR RTP packet into a UDP packet;
   encapsulating the UDP packet into an IP packet;
   dividing the IP packet such that the IP packet can be sent over a plurality of CDMA channel frames;
   and sending the IP packet over a CDMA air interface.

2. The method of claim 1, wherein the non-native media codec is a speech codec.

3. The method of claim 1, further comprising:
   encapsulating the IP packet into a packet of a fourth type prior to dividing and then dividing the packet of the fourth type such that the packet of the fourth type can be sent over the plurality of CDMA channel frames.

4. The method of claim 3, wherein the packet of the fourth type is a PPP packet sent over a CDMA Service Option 33 channel.

5. The method of claim 1, further comprising: receiving the CDMA channel frames over the CDMA air interface; and decapsulating data within the CDMA channel frames to obtain speech data in the plurality of media frames.

6. The method of claim 1, wherein eight media frames are encapsulated into one AMR RTP packet.

7. The method of claim 1, wherein the encoded media frames comprise Push to Talk speech.

8. A device comprising:
input means for obtaining a plurality of encoded media frames output by a non-native media codec;
first encapsulating means for encapsulating the plurality of encoded media frames into an AMR RTP packet;
second encapsulating means for encapsulating the AMR RTP packet into a UDP packet;
third encapsulating means for encapsulating the UDP packet into an IP packet;
dividing means for dividing the IP packet such that the IP packet can be sent over a plurality of CDMA channel frames of a CDMA air interface; and
output means for outputting the IP packet over the CDMA air interface in the plurality of CDMA channel frames.

9. The device of claim 8, wherein the non-native media codec is an AMR speech codec.

10. The device of claim 8, further comprising:
encapsulating the IP packet into a packet of a fourth type prior to dividing and then dividing the packet of the fourth type such that the packet of the fourth type can be sent over the plurality of CDMA channel frames.

11. The device of claim 10, wherein the packet of the fourth type is a PPP packet sent over a CDMA Service Option 33 channel.

12. The device of claim 8, further comprising: receiving means for receiving the CDMA channel frames over the CDMA air interface; and decapsulating means for decapsulating data within the CDMA channel frames to obtain speech data in the plurality of media frames.

13. The device of claim 8, wherein a plurality of media frames are encapsulated into one AMR RTP packet.

14. A device comprising:
an input unit configured to receive a plurality of encoded media frames output by a non-native media codec;
a first encapsulating unit configured to encapsulate the plurality of encoded media frames received by the input unit into an AMR RTP packet;
a second encapsulating unit configured to encapsulate the AMR RTP packet into a UDP packet;
a third encapsulating unit configured to encapsulate the UDP packet into an IP packet;
a dividing unit configured to divide the IP packet such that the IP packet can be sent output over a plurality of frames of a CDMA air interface; and
an output unit configured to send the IP packet over the CDMA air interface via the plurality of frames.

15. A method of receiving encoded media over a CDMA channel, comprising:
receiving data from a plurality of CDMA channel frames on a CDMA air interface and combining the data from the plurality of CDMA channel frames into a PPP packet;
decapsulating the PPP packet into an IP packet;
decapsulating the IP packet into a UDP packet;
decapsulating the UDP packet into an RTP packet;
decapsulating the RTP packet into an AMR packet;
obtaining data from a payload portion of the AMR packet, wherein the data includes media frames output by a non-native media codec, to thereby obtain speech sent over the CDMA air interface.

16. A device for receiving non-native encoded media over a CDMA channel, comprising:
a receiving unit configured to receive data from a plurality of CDMA channel frames on a CDMA air interface and to combine the data from the plurality of CDMA channel frames into a PPP packet;
a first decapsulating unit configured to decapsulate the PPP packet into an IP packet;
a second decapsulating unit configured to decapsulate the IP packet into a UDP packet;
a third decapsulating unit configured to decapsulate the UDP packet into an RTP packet;
a fourth decapsulating unit configured to decapsulate the RTP packet into an AMR packet;
and a data obtaining unit configured to obtain data from a payload portion of the AMR packet, to thereby obtain the non-native encoded media sent over the CDMA air interface.

17. A system for transferring information from a non-native media codec over an air interface, comprising:
a receiving unit for receiving data output from the non-native media codec;
an encapsulating unit for encapsulating the data output from the non-native media codec into a format compatible with the air interface; and
a transmitting unit for transmitting the encapsulated data over the air interface, the encapsulating unit further comprising:
a first encapsulating unit configured to encapsulate the data into an AMR RTP packet;
a second encapsulating unit configured to encapsulate the AMR RTP packet into a UDP packet; and
a third encapsulating unit configured to encapsulate the UDP patent into an IP packet.

18. The system of claim 17, wherein the air interface is a CDMA air interface.

19. A method of transferring information from a non-native media codec over an air interface, comprising:
receiving data output from the non-native media codec;
encapsulating the data output from the non-native media codec into a format compatible with the air interface by encapsulating the data into an AMR RTP packet, encapsulating the AMR RTP packet into a UDP packet, and encapsulating the UDP packet into an IP packet; and
transmitting the encapsulated data over the air interface.

20. The method of claim 19, wherein the air interface is a CDMA air interface.

21. The method of claim 19, wherein the non-native media codec is an AMR speech codec.

22. A non-transitory computer readable medium embodied with a computer program that provides for transfer of encoded media over a CDMA air interface, said computer program product comprising:
computer code for obtaining a plurality of encoded non-native media frames output by a media codec, and encapsulating the plurality of encoded media frames into an AMR RTP packet;
computer code for encapsulating the AMR RTP packet into a UDP packet;
computer code for encapsulating the UDP packet into an IP packet;

computer code for dividing the IP packet such that the IP packet can be sent over a plurality of CDMA channel frames; and computer code for sending the IP packet over the CDMA air interface.

23. A non-transitory computer readable medium embodied with a computer program that provides for transfer of encoded media over a CDMA air interface, said computer program product comprising:

computer code for receiving data from a plurality of CDMA channel frames on a CDMA air interface and combining the data from the plurality of CDMA channel frames into a PPP packet;

computer code for decapsulating the PPP packet into an IP packet;

computer code for decapsulating the IP packet into a UDP packet;

computer code for decapsulating the UDP packet into an RTP packet;

computer code for decapsulating the RTP packet into an AMR packet; and computer code for obtaining data from a payload portion of the AMR packet, wherein the data includes media frames output by a non-native media codec, to thereby obtain speech sent over the CDMA air interface.

24. A network element for sending encoded media over a CDMA channel, comprising:

means for obtaining a plurality of encoded media frames output by a non-native media codec, and encapsulating the plurality of encoded media frames into an AMR RTP packet;

means for encapsulating the AMR RTP packet into a UDP packet;

means for encapsulating the UDP packet into an IP packet;

means for dividing the IP packet such that the IP packet can be sent over a plurality of CDMA channel frames; and means for sending the IP packet over a CDMA air interface.

* * * * *